United States Patent [19]
Lu

[11] 3,936,010
[45] Feb. 3, 1976

[54] CASSETTE FOR FILM AND DRIVING MEANS THEREOF

[76] Inventor: Shui-Ting Lu, No. 28-3, Sin Sen South Road, Sec. 3, Taipei, China /Taiwan

[22] Filed: June 28, 1974

[21] Appl. No.: 483,958

[52] U.S. Cl. .................................................. 242/194
[51] Int. Cl.² ...................... G03B 1/04; G11B 15/32
[58] Field of Search ................... 242/193, 194–200; 352/156, 72, 78 R

[56] References Cited
UNITED STATES PATENTS

| | | | |
|---|---|---|---|
| 3,484,056 | 12/1969 | Sugino et al. | 242/193 |
| 3,552,685 | 1/1971 | Larsen | 242/194 |
| 3,639,697 | 2/1972 | Koguma et al. | 242/194 X |
| 3,669,384 | 6/1972 | Hathaway | 242/194 |

Primary Examiner—Leonard D. Christian

[57] ABSTRACT

Cassette for film comprising a double-decked case having an upper half and a lower half compartment separated by a partition member therebetween, a supply reel and a take-up reel, each with a hub contained respectively within said upper and lower half compartments, said hubs being retained between projecting flanges forming hub tubes in the center of the upper half compartment, partition member and lower half compartment, and a plurality of guide rollers provided inside and at each corner of the cassette to orient the route of the film for advancing and rewinding between said reels, the arrangement being such that the double-decked formation substantially reduces the dimension lengthwise of a conventional cassette without reducing its capacity and preserving performance quality.

4 Claims, 10 Drawing Figures

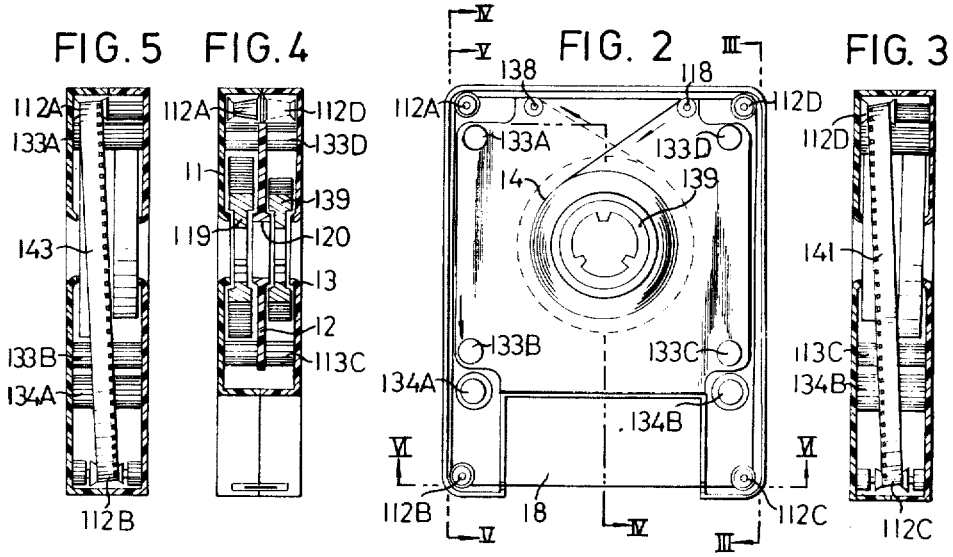
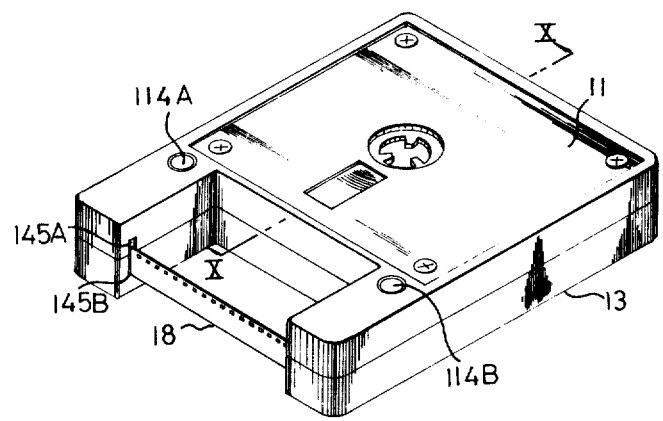

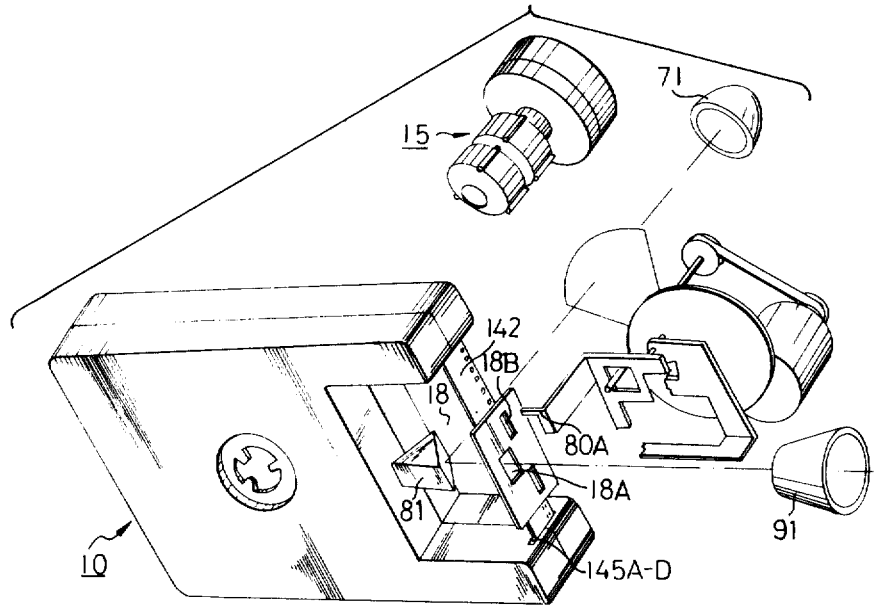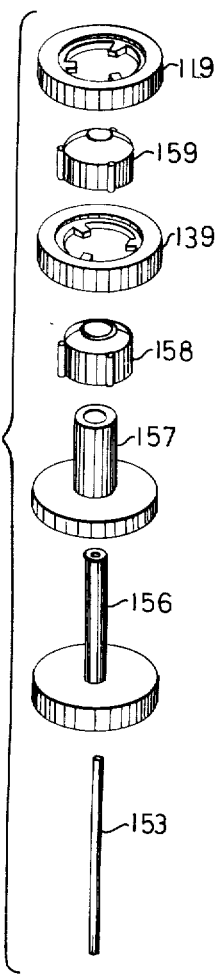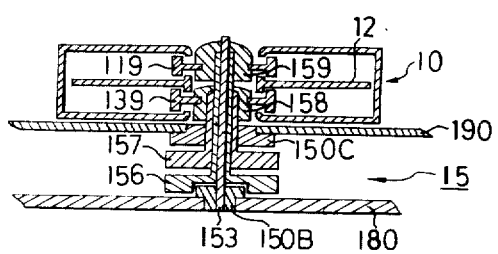

CASSETTE FOR FILM AND DRIVING MEANS THEREOF

FIELD OF INVENTION

The present invention relates generally to a cassette for film, and driving means therefor, and more particularly to a double-decked cassette for movie film which cuts down one half of the lengthwise dimension without reducing the ordinary cassette capacity. Driving means having dual shafts, one within the other, is devised for the novel type of cassette of the present invention.

BACKGROUND OF INVENTION

Modern movie projector tends to adopt cartridgized reels for the simplification of operation.

In the field of movie projection, many famous manufacturers such as Kodak, and Bell & Howell have cartridgized their small size films. Bolex even dramatized the effect by introducing a so called "Multi-cassette" system. Yet, each has the same disadvantage that at least one auxiliary spool is needed externally of the cartridge or cassette. One cannot remove the cartridge or cassette in the middle of projection but has to wait until the whole reel is finished running or rewinding. As for another brand "Technicolor", an endless cartridge has been offered to meet a different purpose such as displaying in exhibition or advertisement. The endless type doesn't give the possibility for fast forward and rewinding and hence offers less selectivity. Also, large intersurface friction causes damage to the film.

SUMMARY OF INVENTION

Therefore, the main object of the present invention is to provide a cassette for film that will not only reduce its size dimensionally, but also without jeopardizing its performance quality.

Another object of the present invention is to provide a cassette of double-decked construction whereby with the aid of a plurality of guide rollers, the route of the advancing or rewinding is made smooth to avoid the undesirable effect resulting from vibration.

Still another object of the present invention is to provide a suitable means for driving two reels stacked on the upper and lower decks through a dual spindle shaft, one within the other, to actuate the revolving of the reel hubs.

Other objects and features of the present invention will become apparent through the following detailed description to be taken in conjunction with the annexed drawings.

BRIEF DESCRIPTION OF DRAWINGS

FIG. 2 is a top view of the above said embodiment with the top of the case removed to see the details inside the upper half;

FIG. 3 is a side cross-sectional view along line III—III in FIG. 2 showing the inclined routing of the film;

FIG. 4 is a side cross-sectional view along line IV—IV in FIG. 2 showing the positions of supply and take-up reels of the film;

FIG. 5 is a side cross-sectional view along V—V in FIG. 2 showing the inclined routing of the film;

FIG. 6 is a front cross-sectional view along line VI—VI in FIG. 2;

FIG. 7 is a front perspective view of the said cassette for film;

FIG. 8 is a perspective view showing the relative position of a cassette for film of the present invention with the film advancing mechanism and also the optical system;

FIG. 9 is an exploded perspective view of the driving system and the hubs of the film reels; and FIG. 10 is a side cross-sectional view along line X—X in FIG. 7 with insertion of the driving system of FIG. 9.

DETAILED DESCRIPTION OF EMBODIMENTS

Figure 1:
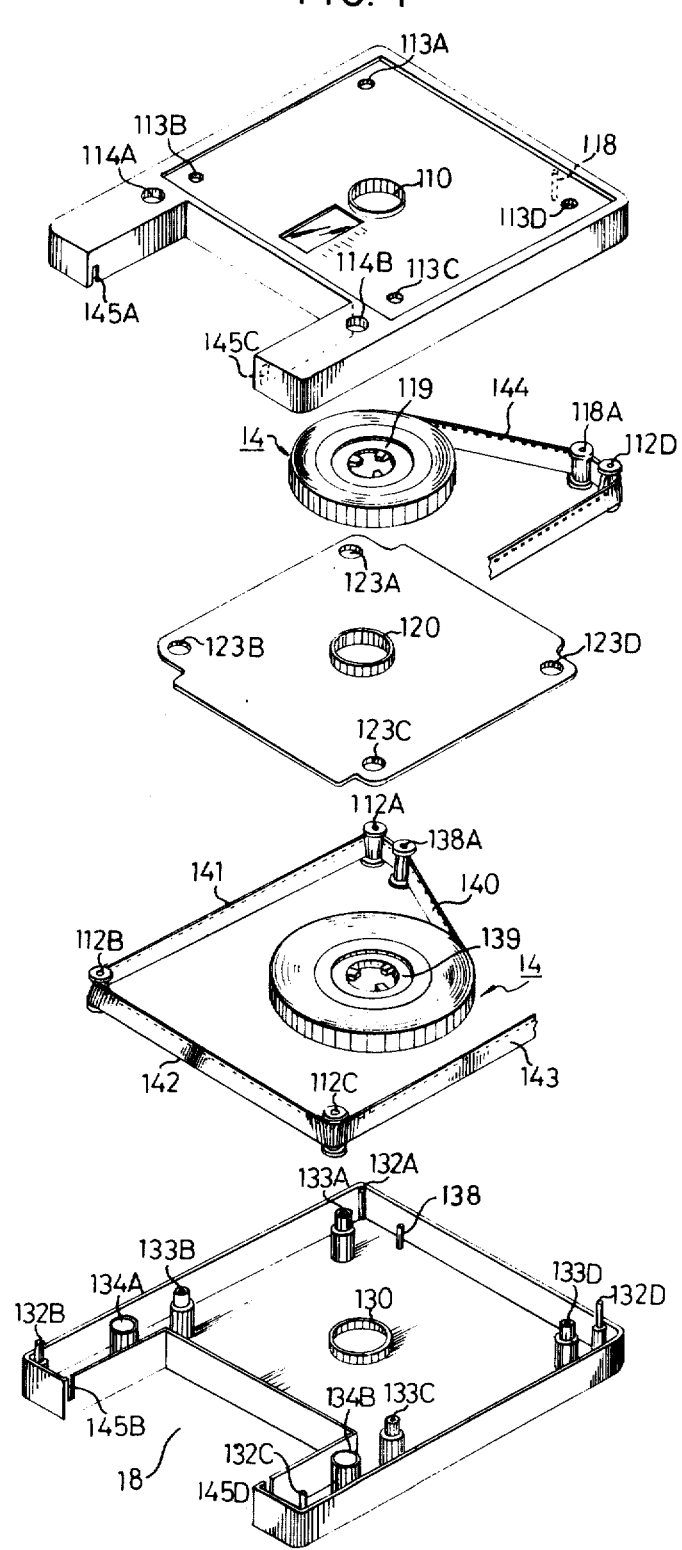
FIG. 1 is an exploded perspective view of a preferred embodiment of the cassette of the present invention applied to an 8 m/m film.

As shown in FIGS. 1-7, the cassette for film 10 of the present invention comprises an upper cassette half 11, a lower cassette half 13, a partition member 12, an upper reel hub 119, a lower reel hub 139, film 14, a plurality of film guide rollers 112A-D, a plurality of film-inclining and adjusting guide rollers 118A, 138A, cassette holding holes 134A, 134B, (114A) (114B) and window 111.

In FIG. 1 formation of a hub tube to support the upper and lower hubs are shown. This hub tube comprises flange rings 110 and 130 respectively at the centers of upper and lower halves 11 and 13, and the flange ring 120, that extends both upward and downward vertically to corresponding centers of the partition member 12.

Projection pins 132A-D are provided, respectively, at the four corners of the lower cassette half and their corresponding corners of the upper cassette half for insertion of the projecting pins 132A-D, so as to support pivotedly the tapered guide rollers 112A-112D upon the joining together of the upper and lower cassette halves.

In order to lead and guide the film smoothly from the lower reel hub 139 to the upper reel hub 119, or vice-versa, prior to taking up the film, the inclination of the film is oriented and corrected by guide rollers 118A, 138A, supported by projecting pins 118, 138. For film slope orientation, said rollers 118A and 138A play an important role in this invention. The four guide rollers 112A-D lead the film winding in such a way that they provide the inclination of sections 141, 143 to enable film to wind from the lower cassette half to the upper cassette half and vice-versa. Rollers 118A and 138A correct the film before it is wound on or released from the hubs. Thus rollers 118A and 138A prevent the film from being wound in an irregular manner. In addition, these two guide rollers function as a buffer in regulating the film speed.

Four fixing posts 133A-D, each with screw holes for securing both the upper and lower cassette halves, are provided, respectively, adjacent to the inner side in respect of said four pins 132A-D. The location of the posts 133A-D correspond to the fixing holes 123A-D on the partition member 12 to combine the upper and lower cassette halves and eliminate need of any fasteners (see FIG. 4). Thus, the upper and lower cassette halves are joined together. The film section 140 of the film tape 14, wound on the film hub 139 in the lower cassette half (see FIG. 1) moves in an inclined manner at the film section 141 through the film guide roller 138A and the tapered guide 112A onto the tapered guide roller 112B (see FIGS. 1 and 5). It then passes again in a horizontal manner at the film section 142 through gaps 145A-D onto the tapered guide roller 112C (see FIGS. 1 and 2). At section 143 the film moves in an inclined manner through the tapered guide roller 112D and the guide roller 118A onto the hub 119 of the upper cassette half to complete a whole winding and taking-up process (see FIGS. 1 and 2). Hence, the cassette according to the present invention can position the film in the space between the two stacked decks, thereby reducing the dimension lengthwise considerably in comparison with that of the conventional cassette and without causing any reduction to the film capacity.

The recess 18 serves as a path way for film section 142 between gaps 145A–D, and also facilitates the optical layout as shown in FIG. 8.

The drive means of the cassette according to the present invention is different from the conventional ones. As shown in FIGS. 8, 9 and 10, the driving system 15 is supported by a center rod 153. The center rod 153 is secured by boss 150B fixed at the lower chassis 180. Conventional transmission means (not shown in the drawing) may engage with an inner shaft 156 with a take-up reel table to accomplish the rotational operation, causing the take-up reel spindle 159 fixed thereon to rotate the upper reel hub 119. An outer spindle shaft 157 with a supply reel table is engaged with the inner spindle shaft 156 in a loose frictional relationship. Thus, when the inner spindle shaft 156 rotates, the outer spindle shaft 157 will rotate as well. In addition, as the dual drive shaft rotates in the same direction, it reduces the rotational load.

In FIG. 8, the relative position of a cassette for film of the present invention with the film advancing mechanism is shown. Cassette 10 has film section 142 passing across gaps 145A–D. On the path of section 142, a plate having gate 18A and slit 18B is disposed. Claw 80A of a conventional film advancing mechanism pulls through the slit 18B intermittently to advance the film at a predetermined speed. An optical system composed of a condenser 71, a reflecting means, such as a prism 81, and a projecting lens 91 are diposed as shown. The prism 81 is placed within the recess 18 of the cassette 10 with condenser 71 and lens 91 at desired angles. The light path is in the sequence of condenser 71 - prism 81 - film 142 - gate 18A - lens 91. The cassette is driven by the driving system 15.

The reel hubs of the cassette 10 are driven by driving means 15, details of which are shown in FIG. 9 and 10.

The above embodiment is given only for illustrative purposes and not by way of limitation, and modifications such as to be used in a similar manner in other related fields, will become evident to those skilled in the art which will fall within the scope of the attached claims.

I claim:

1. A cassette for film comprising a rectangular case including an upper and a lower compartment forming halves of said case, a partition plate disposed between the halves of the case, a supply reel and a take-up reel rotatably and coaxially mounted within each half of the case respectively on opposed sides of said partition plate, a plurality of tapered, rotatable guide rollers located substantially adjacent the corners of said case for successively receiving the film from one of said reels, for directing the film from the plane of said one reel toward a plane intermediate the planes of said reels, then in a plane parallel to and intermediate the planes of said reels, then in a direction toward the plane of the second of said reels and finally directing the film into the plane of said second of said reels, and a rotatable cylindrical correcting guide roller disposed between each of the first and last tapered guide rollers and the associated reel and adjacent said first and last tapered guide rollers respectively, whereby the film is always passed around the same circumferential distance of said first and last tapered guide rollers to provide a constant and uniform path for said film between said rotatable correcting guide rollers.

2. A cassette as claimed in claim 1 and further comprising means for securing the two halves of said case together and for securing the partition plate therebetween.

3. A cassette as claimed in claim 1 and further comprising driving means including dual concentric shafts and driving tables mounted thereon for frictionally driving said reels in the same direction to thereby reduce the load on said driving means and a center rod for supporting said driving means.

4. A cassette as claimed in claim 1 wherein one corresponding side of each of the halves of said case have a recessed portion intermediate the ends of said corresponding side and provided with openings in the walls of said halves of said case facing the recessed portion for passage of the film therethrough when passing from one intermediate tapered guide roller to the next, whereby the film when passing across the recessed portion may be viewed or projected.

* * * * *